(12) United States Patent
Peterson et al.

(10) Patent No.: US 8,433,456 B2
(45) Date of Patent: Apr. 30, 2013

(54) SYSTEM AND METHOD FOR CONTROLLING POWER WINDOWS OF A VEHICLE

(75) Inventors: David G. Peterson, East Liberty, OH (US); Brian K. Lickfelt, Powell, OH (US); John Sgueglia, Columbus, OH (US); Trevor Scott Whitten, East Liberty, OH (US)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 12/700,000

(22) Filed: Feb. 4, 2010

(65) Prior Publication Data

US 2011/0190962 A1 Aug. 4, 2011

(51) Int. Cl.
*G05D 1/00* (2006.01)

(52) U.S. Cl.
USPC .......... 701/2; 701/1; 701/36; 701/45; 701/48; 701/49; 340/5.32; 340/5.26; 340/5.61; 340/5.62; 340/5.64; 380/28; 380/42; 380/43; 380/44; 380/46; 307/9.1; 307/10.1; 307/10.2; 307/10.3; 307/10.4; 359/601; 359/604; 341/176

(58) Field of Classification Search ................ 701/1, 36, 701/45, 48, 49, 52; 340/5.23, 5.26, 5.61, 340/5.62, 5.64, 5.71, 5.72, 5.8, 10.1, 10.42, 340/12.55, 12.28, 12.51, 425.1, 426.36, 461, 340/462.28, 525, 539.1, 539.11; 380/28, 380/42, 43, 44, 46, 262, 265, 274, 429; 307/9.1, 307/10.3, 10.4, 10.1, 10.2, 10.7; 359/601, 359/604; 713/168, 181; 341/176; 200/600; 362/494; 367/197

See application file for complete search history.

(56) References Cited

U.S. PATENT DOCUMENTS

| | | | |
|---|---|---|---|
| 2,576,816 A * | 11/1951 | Wahlberg | 180/289 |
| 5,293,105 A | 3/1994 | West, Jr. | |
| 5,321,345 A | 6/1994 | Lambros et al. | |
| 5,585,702 A | 12/1996 | Jackson et al. | |
| 5,717,387 A | 2/1998 | Suman et al. | |
| 5,813,765 A * | 9/1998 | Peel et al. | 374/141 |
| 6,243,022 B1 | 6/2001 | Furukawa | |
| 6,253,135 B1 | 6/2001 | Hubacher | |
| 7,055,340 B2 | 6/2006 | Umebayashi et al. | |
| 7,132,642 B2 * | 11/2006 | Shank et al. | 250/221 |
| 8,061,626 B2 * | 11/2011 | Flick | 236/51 |
| 8,098,130 B2 * | 1/2012 | Baruco et al. | 340/5.72 |
| 2002/0148986 A1 * | 10/2002 | Hochstein | 250/573 |
| 2005/0046553 A1 * | 3/2005 | Flick | 340/426.1 |
| 2007/0210737 A1 | 9/2007 | Brander | |

(Continued)

FOREIGN PATENT DOCUMENTS

KR 1020060111175 10/2006

*Primary Examiner* — McDieunel Marc
(74) *Attorney, Agent, or Firm* — Rankin, Hill & Clark LLP

(57) ABSTRACT

A system and method for controlling power windows of a vehicle includes a receiver mounted on the vehicle for receiving an open window request signal wirelessly from a portable device, at least one exterior condition sensor mounted on the vehicle for detecting an adverse exterior condition relative to the vehicle, and a controller mounted on the vehicle for communicating with the receiver and the at least one exterior condition sensor. The controller commands opening of the one or more power windows when the receiver receives the open window request signal provided the at least one exterior condition sensor does not detect an adverse exterior condition relative to the vehicle.

24 Claims, 3 Drawing Sheets

U.S. PATENT DOCUMENTS

| | | |
|---|---|---|
| 2008/0048844 A1 | 2/2008 | Watanabe et al. |
| 2008/0084177 A1* | 4/2008 | Sander et al. .................. 320/101 |
| 2008/0117079 A1* | 5/2008 | Hassan ......................... 340/901 |
| 2008/0136358 A1 | 6/2008 | Newman et al. |
| 2009/0071178 A1 | 3/2009 | Major et al. |
| 2009/0198420 A1* | 8/2009 | Newman et al. ................ 701/49 |
| 2010/0097175 A1* | 4/2010 | Kasai et al. .................... 340/5.8 |

* cited by examiner

SYSTEM AND METHOD FOR CONTROLLING POWER WINDOWS OF A VEHICLE

BACKGROUND

Exemplary embodiments herein generally relate to a control system and method for a vehicle, and more particularly relate to a window control system and method for controlling power windows of a vehicle.

Many vehicles come equipped with systems that enable remote actuation of various vehicle functions through a portable communication device (e.g., a key fob). Vehicle functions commonly included in such remote actuation systems include locking/unlocking of passenger cabin entry doors, unlatching/latching of trunks and tailgates, and powered opening/closing of various closures, such as tailgates, sliding doors, etc. Some of these systems also include a power window control function that allows windows of the vehicle to be opened or closed remotely using the portable communication device. This sometimes includes powered opening or closing of a sunroof on sunroof equipped vehicles.

One longstanding problem for vehicle owners is rain or snow entering a vehicle through an open window, such as a door window or a sunroof. The open window or windows can be the result of the vehicle user leaving these open when exiting the vehicle. Alternatively, in vehicles having remote actuation systems that include remote window opening functionality, the window or windows can be opened inadvertently through the portable device. In addition to the problem of rain or snow entering a vehicle, an inadvertently opened window can be a security risk to contents left in the vehicle and can lead to customer dissatisfaction.

In one known remote window control system, the user is required to push the unlock button on the key fob two times and hold down the unlock button on the second push. Window opening begins only after the unlock button is held for more than a predetermined amount of time and continues until the window is fully opened or the held unlock button is released, whichever occurs first. The required delay before opening is intended to reduce the likelihood of the windows being opened accidentally, but unfortunately inadvertent window opening can still occur. To close the windows, the user pushes the lock button two times and holds down the lock button on the second push. Again, a delay can be used to reduce inadvertent closing. After the delay, the windows will typically move toward their fully closed positions until fully closed or the lock button is released, whichever occurs first.

Current systems require the key fob to have a line of sight to the vehicle before closing the windows. Without a line of sight, U.S. regulations require the key fob (and thus the user) to be within six meters of the vehicle to help ensure that the windows are not inadvertently closed without the user knowing the condition of the vehicle. It is difficult to determine the distance to the vehicle using an RF signal transmitted from the key fob itself. In some cases, vehicle functions are activated even though the key fob is outside a predetermined radius. In one example, a window is closed via the key fob when the user is not within a line of sight of the vehicle. Such circumstance can endanger passengers and/or passersby since there is no mechanism to stop the window from closing as the user can be unaware of the hazard.

Separately, some more advanced remote actuation systems employ smart communication functionality that requires a user to only possess a key fob to initiate certain vehicle functions (e.g., unlocking doors of the vehicle). In these systems, the user need not perform any physical operation on the key fob (e.g., pushing of a button) for operating certain functions, and can leave the fob in a pocket, purse, etc. for such enabled functions. In operation, the vehicle will detect the presence of the fob based on sensors and/or switches. When triggered, the vehicle will send a low frequency (LF) search field. Within the search field, the vehicle looks for or searches for the key fob (e.g., sends out a request signal).

For example, an antenna associated with a particular vehicle door can emit a low frequency field within a range of about 1 meter for sensing when the key fob is adjacent the door to be unlocked. If found, the key fob will reply to the request signal or search field via RF communications. In this example, the key fob can send back a unique identifier confirming that it is properly associated with the vehicle (e.g., a confirmation signal). When the vehicle receives the confirmation signal, it will unlock a door or doors providing access into the vehicle.

SUMMARY

According to one aspect, a window control system is provided for controlling one or more power windows of a vehicle. More particularly, in accordance with this aspect, the window control system includes a receiver mounted on the vehicle for receiving an open window request signal wirelessly from a portable device. At least one exterior condition sensor is mounted on the vehicle for detecting at least one adverse exterior condition relative to the vehicle. A controller is mounted on the vehicle and is configured to communicate with the receiver and the at least one exterior condition sensor. The controller is further configured to command opening of the one or more power windows when the receiver receives the open window request signal and the at least one exterior condition sensor does not detect the at least one adverse exterior condition.

According to another aspect, a control method is provided for controlling one or more power windows of a vehicle. In the method according to this aspect, an open window request signal is received wirelessly from a portable device requesting opening of the one or more power windows of the vehicle. At least one exterior condition is monitored relative to the vehicle through at least one exterior condition sensor mounted on the vehicle. A determination is made if opening of the one or more power windows should be inhibited based on the at least one exterior condition. Opening of the one or more power windows is inhibited when determined that the opening of the one or more power windows should be inhibited, otherwise the one or more power windows are opened.

According to still another aspect, a window control method is provided for a vehicle. In the method according to this aspect, an open window request is received from a portable device. At least one exterior condition is measured relative to the vehicle. A determination is made as to whether the at least one exterior condition is an adverse exterior condition. The one or more power windows of the vehicle are opened in response to the open window request unless the at least one exterior condition is determined to be an adverse exterior condition.

According to still another aspect, a method is employed to control a power window in a vehicle. A wireless activation signal is sent via a portable device to close a window in the vehicle. The activation signal is received from the portable device and a wireless verification signal is returned to verify the activation signal is authorized for the vehicle. A wireless identification signal is sent within a predetermined range to indicate the portable device is authorized to close vehicle window and within the predetermined range. The identification signal is received when the portable device is within the predetermined range of the vehicle. A close command is sent to a windows controller to close the window provided the identification signal is received within a predetermined time in response to the verification signal.

DETAILED DESCRIPTION

Figure 1:
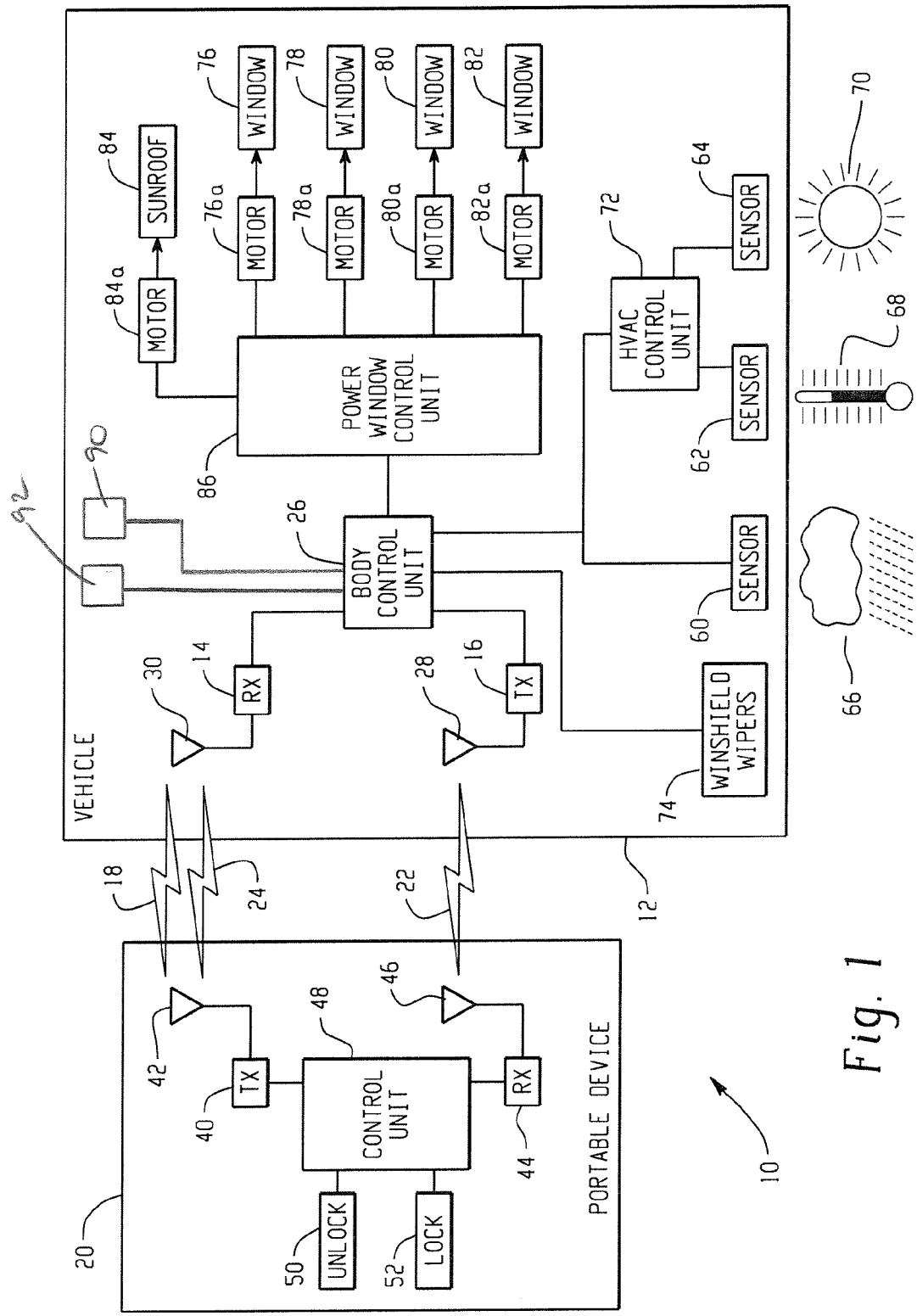
FIG. 1 is a schematic diagram showing an exemplary window control system for controlling one or more power windows of a vehicle.

Referring now to the drawings, wherein the showings are for purposes of illustrating one or more exemplary embodiments, FIG. 1 schematically illustrates a window control system 10 for controlling one or more power windows of a vehicle 12. As shown, the system 10 can include a receiver 14 mounted on the vehicle 12 and a transmitter 16 both mounted on the vehicle 12. As will be described in more detail below, the receiver 14 is for receiving an actuation or activation signal 18 (e.g., open window request signal) wirelessly from a portable device 20 and the transmitter 16 is for sending a request for verification signal 22 to the portable device 20 to request appropriate identification therefrom, such as in response to receipt of the open window request signal 18 by the receiver 14. The receiver 14 is also for receiving a confirmation signal 24 from the portable device 20 that is responsive to the verification signal 22.

The system 10 can further include a controller or body control unit 26, which is mounted on the vehicle 12 and is operatively connected to the receiver 14 and the transmitter 16. Through the control unit 26, the actuation signal 18 can initiate a handshake communication wherein the system 10 verifies the portable device 20 is within a predetermined distance from the vehicle 12. More particularly, once the actuation signal 18 is received from the portable device 20, the transmitter 16 can send the verification signal 22 (e.g., at a low frequency) within a search field (i.e., within a predefined area of the vehicle 12) to request confirmation from the portable device 20. The transmitter 16 can include an antenna 28 for transmitting the verification signal 22. Similarly, the receiver 14 can include an antenna 30 for receiving actuation signal 18 and confirmation signal 24 from the portable device 20. It is to be appreciated that the verification signal 22 (and the corresponding search field) can radiate from the antenna 28 in all directions, though some directions may be stronger than others. In particular, power can be appropriately provided to the antenna 28 to allow communication only within a predefined area or search field of the vehicle 12. It is to be appreciated that other embodiments of the present disclosure can employ different quantities and powers of antennas.

The portable device 20 can include a portable transmitter 40 for sending the actuation signal 18, which can be an open window request signal, and/or the confirmation signal 24 to the vehicle 12. In particular, the transmitter 40 can include an antenna 42 for sending the signals 18, 24. The portable device 20 can also include a portable receiver 44 for receiving the verification signal 22. The receiver 44 can likewise include an antenna 46 for receiving the signal 22. The portable device 20 can further include a controller or control unit 48 for coordinating communication and operations between the transmitter 40 and the receiver 44.

The control unit 48 can be operatively connected to one or more actuators, such as first button 50 and second button 52 in the illustrated embodiment. While only two actuators are shown in the illustrated embodiment, and the two shown actuators are indicated as being buttons 50 and 52, it is to be appreciated that any number of actuators could be included on the portable device and any type of actuators (e.g., sliding switches, dials, etc.) or combinations thereof could be used. In the illustrated embodiment, the buttons 50 and 52 can correspond to an unlock button 50 and lock button 52. Though not shown, additional buttons could be included, such as a panic button and an open trunk button, among others.

In an exemplary embodiment, the buttons 50, 52 can activate particular functionality of the vehicle 12 such as unlocking doors of the vehicle 12 and locking doors of the vehicle 12, respectively, by depressing each button 50 and 52 one or more times. The functionality of the buttons 50, 52 can vary based on the number of time or combination of buttons pressed. When smart functionality is employed, pressing of the buttons 50, 52 can cause actuation signal 18 to be transmitted from the transmitter 40 to the receiver 14 on the vehicle 12. Receipt of the actuation signal 18 by the receiver 14 as confirmed by the body control unit 26 can, in turn, cause transmitter 16 on the vehicle 12 to transmit the verification signal 22 within a predefined search area. If the portable device 20 is in the search area, the portable receiver 44 can receive the verification signal 22 and, through the control unit 48, can generate a confirmation signal 24 to be sent from the portable transmitter 40 to the receiver 14 of the vehicle 12. Alternatively, the portable device 20 could be configured to employ one-way communications with the vehicle 12, in which case the portable device receiver 44 and associated antenna 46 could be eliminated (as could the transmitter 16 on the vehicle 12). In this arrangement, the actuation signal 18 would be sent from the transmitter 40 to the receiver 14 and no handshake communications would occur between the portable device 20 and the vehicle 12.

In an exemplary embodiment, remote opening of windows of the vehicle 12 can be initiated through the unlock button 50. For example, the unlock button 50 can be required to be pressed two times and held for a predetermined period of time on the second depression thereof. When this occurs, the control unit 48 can instruct the transmitter 40 to transmit the actuation signal 18 as an open window request signal. When in range, the receiver 14 onboard the vehicle 12 can receive the actuation signal 18. If employing smart function technology, the body control unit 26 can be informed of receipt of the open window request signal 18 and can instruct the transmitter 16 to send a verification signal 22 to the portable device 20 in response to receipt of the open window request signal 18 by the receiver 14. As already described, the verification signal 22 can be transmitted within a predefined area of the vehicle 12 to request confirmation from the portable device 20. When in the predefined area, the portable device 20 can respond by sending the confirmation signal 24 back to the vehicle 12. Alternatively, when no smart function technology is included and/or being used, only the open window request signal 18 need be transmitted from the portable device to the vehicle 12 to initiate a method for controlling opening of one or more power windows of the vehicle 12.

The system 10 can further include at least one exterior condition sensor (e.g., one or more of sensors 60, 62, 64)

mounted on the vehicle 12 for detecting at least one adverse exterior condition relative to the vehicle 12. The body control unit 26 can be configured to communicate with the exterior condition sensors 60, 62, 64. In the illustrated embodiment, the at least one exterior condition sensor is at least one of a rain sensor 60 for detecting rain as indicated schematically at 66, a temperature sensor 62 for detecting an ambient temperature around the vehicle 12 as indicated schematically at 68 and/or a solar load sensor 64 for detecting a solar load on the vehicle 12 as indicated schematically at 70, though it is to be appreciated that other exterior condition sensors could be employed. In one example, the at least one exterior condition sensor of the system 10 is the rain sensor 60 and the at least one adverse exterior condition detected by the sensor 60 is rain 66 on vehicle 12. In addition or in the alternative, the at least one exterior condition sensor can be the temperature sensor 62 and the at least one adverse exterior condition can be the ambient temperature 68, such as a temperature below a predetermined threshold temperature (e.g., 5 degrees Celsius). Also in addition or in the alternative to one or both of the foregoing, the at least one exterior condition sensor can be the solar load sensor 70 and the at least one adverse condition detected by the solar load sensor 64 can be the solar load 70, particularly a solar load below a predetermined threshold solar load.

In the illustrated exemplary system, the at least one exterior condition sensor includes each of the rain sensor 60, the temperature sensor 62 and the solar load sensor 64, and the at least one adverse exterior condition includes rain, a temperature below a predetermine threshold temperature and a solar load below a predetermined threshold solar load. Advantageously, the sensor 60, 62, 64 can be those already provided on the vehicle 12 for other purposes. For example, the solar load sensor 62 and the temperature sensor 64 could be those already provided on the vehicle 12 and associated with HVAC control unit 72. The rain sensor 60 could also be a rain sensor already provided on the vehicle 12, such as one used to control rain wipers of the vehicle 12, such as schematically illustrated windshield wipers 74, as is known and understood by those skilled in the art.

The control unit 26 can be configured to command opening of one or more power windows of the vehicle 12 when the receiver 14 receives the open window request signal 18 from the portable device 20 and the at least one exterior condition sensor (e.g., one or more of the sensors 60, 62, 64) does not detect an adverse exterior condition (e.g., rain, a temperature below a predetermined threshold temperature and/or a solar load below a predetermined threshold solar load). In addition, if operating with the smart function technology, the control unit 26 can be configured to command opening of the one or more power windows of the vehicle 12 only when the confirmation signal 24 is received from the portable device 20 responsive to the verification signal 22.

The one or more power windows of the vehicle could include, for example, front driver's side window 76, front passenger's side window 78, rear driver's side window 80 and rear passenger's side window 82. Additionally, the one or more power windows could include a sunroof, moon roof or the like as indicated at 84. Each of the one or more power windows 76-84 of the vehicle 12 could include an associated motor 76a, 78a, 80a, 82a, 84a for driving opening and closing of the windows when powered. In an exemplary embodiment, as shown in the illustrated embodiment, the one or more power windows of the vehicle 12 include door windows 76, 78, 80, 82 of the vehicle 12 and the sunroof 84 of the vehicle 12. Energizing of the respective motors 76a, 78a, 80a, 82a, 84a can be coordinated and controlled by a power window control unit 86 as is known and understood by those skilled in the art.

The system 10 can further include at least one close windows switch for closing a plurality of the one or more windows after opening, though this is not required. In one embodiment, the at least one close windows switch includes a pre-existing switch or button 90 already in the vehicle 12, such as the driver's window power UP switch. Normally, the switch 90 is pressed once and held to close the driver's window and, on some vehicles, additionally pressed once and held for a predetermined period of time, e.g., 2 seconds, to automatically close the driver's window without requiring further holding of the switch in the closed position. Usually, the switch operates only a single window (e.g., the driver's window). However, in this embodiment, the switch 90 is operable to close a plurality of the one or more windows in the vehicle (e.g., all open windows).

In particular, to close a plurality of the one or more windows (e.g., the windows opened after receipt of the open window request signal 18), the switch 90 is pressed twice and held on the second depression. When this occurs, the control unit 26 can command the power window control unit 86 to close all open windows (e.g., windows 76-82 and 84). In one embodiment, such closing action occurs for as long as the switch 90 is held on the second actuation or depression. If the switch 90 is released before the windows are closed, the closing action can be stopped, though this is not required. The closing action that occurs after the switch 90 is actuated twice and held on the second actuation can be limited to occur only when the switch 90 is held for more than a predetermined period of time (e.g., 3 seconds).

Alternatively, the close window switch 90 can be some other pre-existing switch in the vehicle 12 and share functionality with this other switch. For example, the switch 90 could be the unlock door switch inside the vehicle 12. In this case, when actuated once, the switch 90 could unlock one or more doors on the vehicle; however, when actuated twice and held on the second actuation, the switch 90 could operate as indicated above to close all of the open windows on the vehicle 12. Of course, the switch 90 could also be a stand-alone independent switch and need not share any functionality.

The switch 90 could also have open window functionality, though this is not required. In one embodiment, the switch 90 can open a plurality of the one or more windows of the vehicle 12 via the control unit 26 (e.g., all windows of the vehicle 12 and/or the same windows opened in response to the open window request signal 18). For such opening action, the switch 90 is actuated twice (e.g., double-clicked) and held on the second actuation. When held on the second actuation for more than a predetermined period of time (e.g., 3 seconds), the control unit 26 can command the power window control unit 86 to open the windows. Like the closing operation, the opening operation can be configured to occur for only as long as the switch 90 is held on the second actuation, though this is not required.

The at least one close windows switch can also include a switch 92 in addition or instead of the switch 90, though this too is not required. The switch 92 can operate like the switch 90 to close the plurality of the one or more windows upon actuation. Unlike the switch 90, the switch 92 can be disposed on an exterior of the vehicle 12 so as to be accessible from outside the vehicle 12. In one embodiment, the exterior switch 92 is a pre-existing switch or button on the vehicle, such as an exterior lock button. Normally, the switch 92 is pressed once to lock the doors of the vehicle. However, in this embodiment, the switch 92, configured as a button, can have dual functionality. For example, pressing the switch 92 once can lock doors of the vehicle, whereas pressing the switch 92 twice (i.e., double-clicking) can close the one or more windows through the body control unit 26 and the power window control unit 86. Alternatively, closing the one or more windows could be actuated by pressing the switch 92 twice and holding on the second depression or pressing the switch once and holding for a predetermined period of time.

Such a switch 92 could be advantageously employed in an advanced vehicle remove actuation system where a user generally keeps a key fob stowed when unlocking vehicle doors and/or starting the vehicle. In these systems, the switch 92 continues to allow the user to keep a key fob stowed while allowing the user to close the one or more windows from the vehicle exterior. Like the switch 90, the switch 92 could alternately be some other pre-existing switch on the exterior of the vehicle 12 and could share functionality with this other switch. Also, the switch 92 could be a stand-alone independent switch and need not share any functionality.

Figure 2:
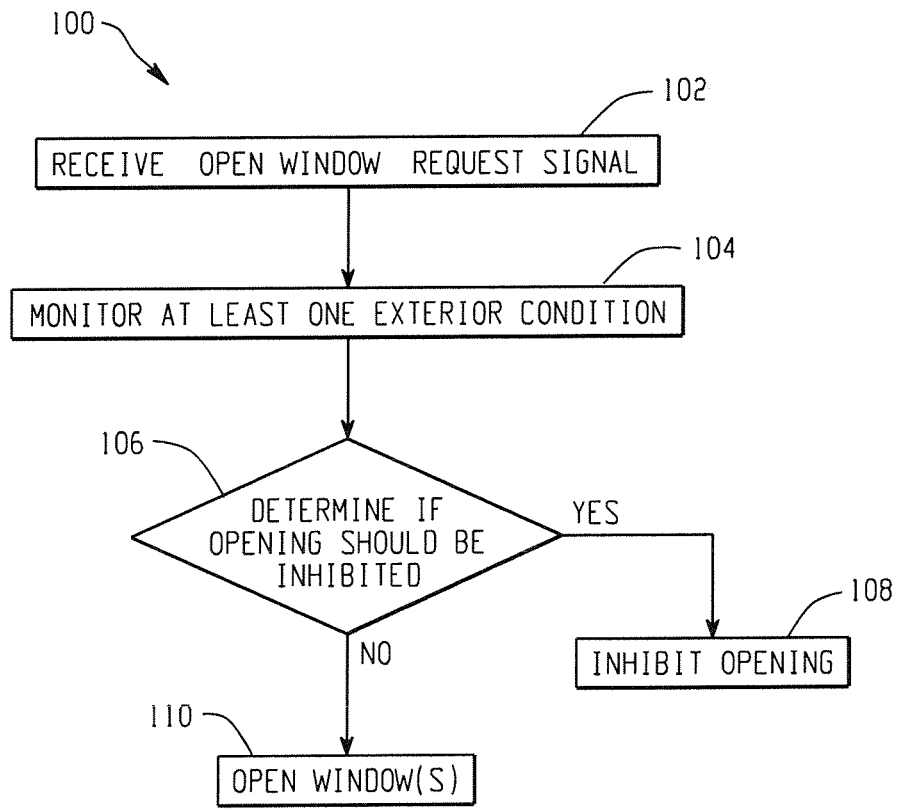
FIG. 2 is a flowchart showing an exemplary control method for opening one or more power windows of a vehicle.

With reference to FIG. 2, an exemplary smart communication method 100 is shown for controlling opening of one or more power windows of a vehicle. The method of FIG. 2 can be used with the window control system 10 of FIG. 1 and will be described with reference thereto, though this is not required. In 102, open window request signal 18 is received wirelessly by the receiver 14 on the vehicle 12 from the portable device 20 requesting opening of the one or more power windows 76, 78, 80, 82, 84 of the vehicle 12. As already described, the open request signal 18 being received 102 can result from transmission of the open request signal 18 from the portable device 20 in response to the unlock button 50 being pushed twice in succession and held for a predetermined period of time (e.g., 3 seconds) after the second push.

In 104, at least one exterior condition is monitored or measured relative to the vehicle 12 through at least one exterior condition sensor mounted on the vehicle 12. As already described, such monitoring can include monitoring at least one of rain 66, ambient temperature 68 and/or solar load 70. In an exemplary embodiment, the monitoring in 104 includes monitoring at least two of rain 66, ambient temperature 68 and solar load 70. In another exemplary embodiment, the monitoring in 104 includes monitoring each of rain 66, ambient temperature 68 and solar load 70.

In 106, a determination is made as to whether or if opening of the one or more power windows 76-84 of the vehicle 12 should be inhibited based on the one or more exterior conditions monitored in 104. Determining if opening should be inhibited in 106 can include determining whether the one or more exterior conditions monitored in 104 is an adverse exterior condition. For example, determining if opening of the one or more power windows 76-84 should be inhibited can include comparing a measured value from 104 as measured by the one or more condition sensors 60, 62 and/or 64 to a threshold value stored in memory of the control unit 26. For example, the rain sensor 60 can measure an amount of precipitation being received by the vehicle 12. If this amount of precipitation exceeds a threshold value stored in a memory of the body control unit 26, a yes determination can be made in 106 that opening of the power windows 76-84 should be inhibited.

Similarly, if the ambient temperature 68 measured by the temperature sensor 64 is compared to a threshold value stored in memory (e.g., 5 degrees Celsius) and determined to be below the threshold value, a yes determination can be made in 106 that opening of the one or more power windows 76-84 should be inhibited. Also similarly, if determined that the solar load 70 as measured by the solar load sensor 62 compares unfavorably to a solar load threshold value stored in the memory of the body control unit 26, a yes determination can be made in 106 that opening of the windows 76-84 should be inhibited. If the measured value or values from 104 compare favorably to threshold values stored in the memory of the body control unit 26 (e.g., a measured exterior condition is not determined to be an adverse condition), then it is determined in 106 that opening of the power windows 76-84 should not be inhibited.

When determined that opening of the one or more power windows 76-84 should be inhibited in 106, opening of the one or more power windows 76-84 is inhibited in 108. Otherwise, the one or more power windows 76-84 can be opened in 110. Accordingly, the one or more power windows 76-84 of the vehicle 12 can be opened in 110 in response to the open window request signal 18 received in 102 unless the one or more exterior conditions monitored in 104 is determined in 106 to be an adverse exterior condition. Once opened, the one or more windows 76-84 can be subsequently closed via the switch 90 as described hereinabove.

Figure 3:
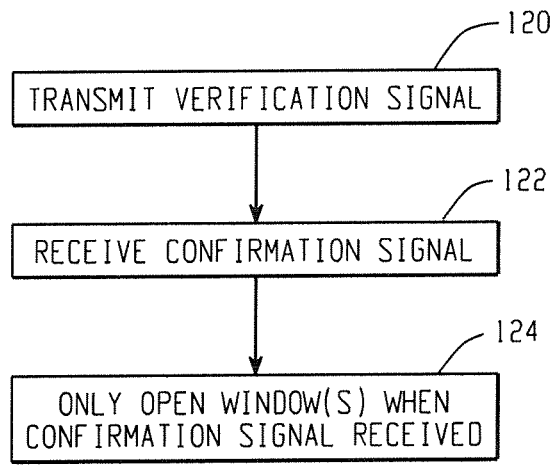
FIG. 3 is another flowchart showing an exemplary smart communication process.

Optionally, when smart communication functionality is employed, with additional reference to FIG. 3, the verification signal 22 can be transmitted wirelessly to the portable device 20 when the open window request signal 18 is received by the receiver 14 (i.e., the verification signal 22 is responsive to the open window request signal 18) in 120. Provided the portable device 20 is within a predefined area or range and thus capable of receiving the verification signal 22, the confirmation signal 24 can be received in 122 wirelessly from the portable device 20 that is responsive to the portable device 20 receiving the verification signal 22. In 124, under smart communication functionality, the one or more power windows 76-84 are only opened when the confirmation signal is received in 122. Accordingly, opening of the one or more power windows in 110, when smart communication functionality is employed, is allowed only when the confirmation signal 24 is received in 122.

Figure 4:
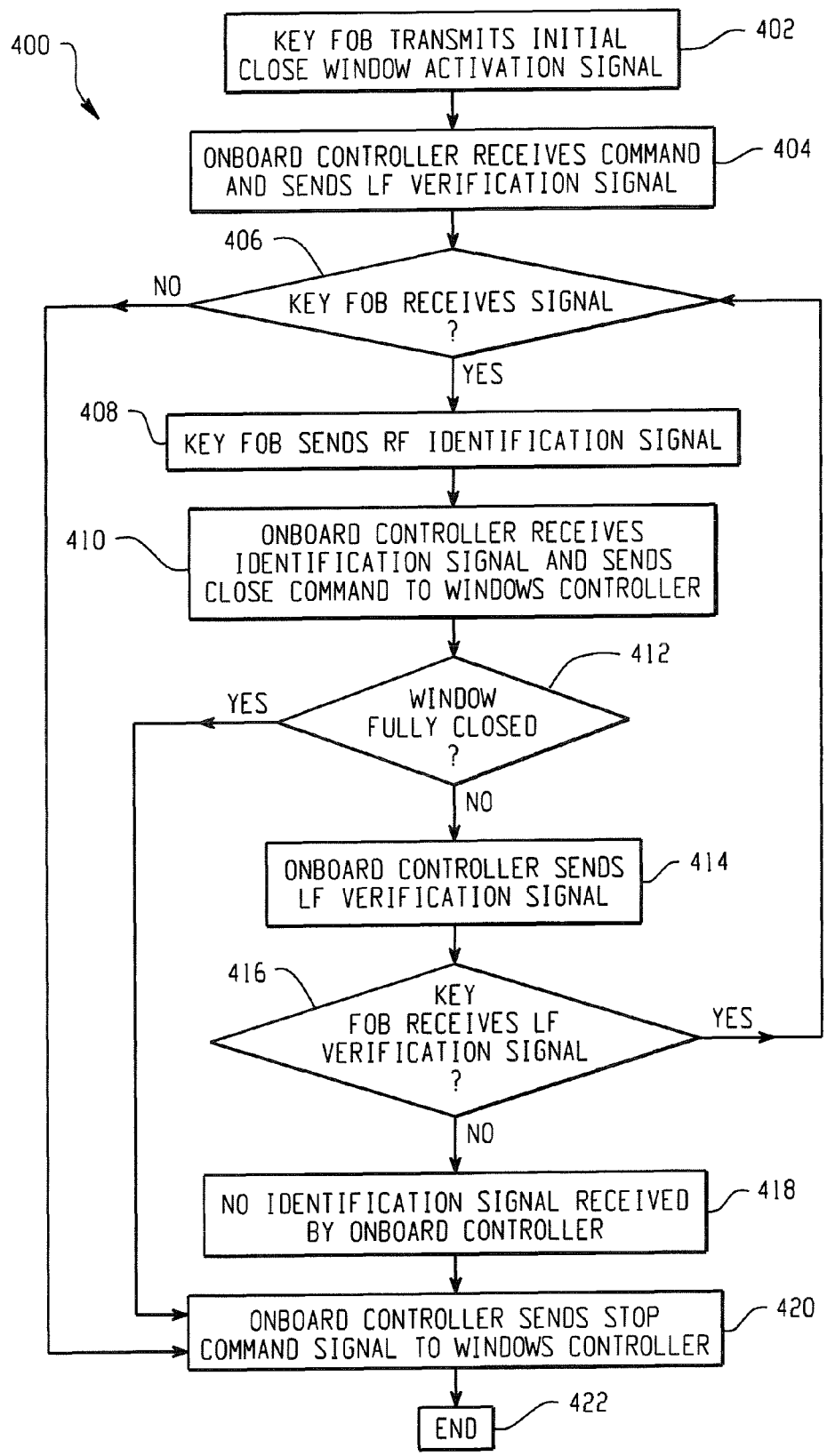
FIG. 4 is still another flowchart showing an exemplary control method for closing one or more power windows of a vehicle.

Referring now to FIG. 4, an exemplary smart communication method 400 is shown for controlling closing of one or more vehicle windows. In one example, the method 400 is utilized with the window control system 10 of FIG. 1 and will be described with particular reference thereto, though this is not required. At 402, key fob 20 transmits an initial close window activation signal 18. The close window activation signal 18 can be transmitted in substantially any wireless protocol in order to facilitate appropriate action thereof. The window activation signal 18 is received by onboard controller 26 at 404 through receiver 14 and the controller 26 returns low frequency verification signal 22 via the transmitter 16 subsequent to receipt of the closed window activation signal command 18. At 406, a determination is made as to whether the key fob 20 received the low frequency verification signal 22. If the key fob 20 received the low frequency verification signal 22, a radio frequency identification signal 24 is emitted by the key fob 20 at 408.

At 410, the onboard controller 26 receives the radio frequency identification signal 24 via the receiver 14 and sends a close command to window control unit 86. A determination can be made as to whether a window is fully closed at 412 and, if not, the onboard controller 26 sends another low frequency verification signal 22 to the key fob 20 at 414. At 416, a determination is made as to whether the key fob 20 received the low frequency signal 22. If so, the method continues at 406 in a loop wherein the onboard controller 26 receives an identification signal 24 from the key fob 20 and continues to send a close command to the windows controller 86. As long as the low frequency verification signal 22 is received by the key fob 20 and an identification signal 24 is returned thereto, the close command continues to drive the one or more windows closed.

This operation continues until the confirmation signal 24 is not received by the onboard controller 26, such as at 418, which would elicit a stop command sent to the windows controller 86. The methodology ends at 422. If the window is fully closed at 412, the methodology proceeds directly to the end function at 422. Similarly, if at 406 the key fob 20 no longer emits close command signal (such as when a user stops holding a button down), the operation is interrupted and the method ends.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, the control unit 36 could be distributed throughout the system 10. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate (e.g., body control unit 36, HVAC control unit 72 and power window control unit 86).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A window control system for controlling one or more power windows of a vehicle, comprising:
   a receiver mounted on the vehicle for receiving an open window request signal wirelessly from a portable device;
   a transmitter mounted on the vehicle for sending a verification signal to said portable device in response to receipt of said open window request signal by said receiver, said verification signal transmitted within a predefined area of the vehicle to request confirmation from said portable device;
   at least one exterior condition sensor mounted on the vehicle for detecting at least one adverse exterior condition relative to the vehicle; and
   a controller mounted on the vehicle and configured to communicate with said receiver, said transmitter and said at least one exterior condition sensor, said controller further configured to command opening of the one or more power windows when said receiver receives said open window request signal, said at least one exterior condition sensor does not detect said at least one adverse exterior condition and a confirmation signal is received from said portable device responsive to said verification signal.

2. The system of claim 1 wherein said at least one exterior condition sensor is at least one of a rain sensor for detecting rain, a temperature sensor for detecting an ambient temperature around the vehicle or a solar load sensor for detecting a solar load on the vehicle.

3. The system of claim 2 wherein said at least one exterior condition sensor includes each of a rain sensor, a temperature sensor and a solar load sensor.

4. The system of claim 1 wherein said at least one exterior condition sensor is a rain sensor and said at least one adverse exterior condition is rain on the vehicle.

5. The system of claim 4 wherein said rain sensor is also used to control windshield wipers of the vehicle.

6. The system of claim 1 wherein said at least one exterior condition sensor is a temperature sensor and said at least one adverse exterior condition is a temperature below a predetermined threshold temperature.

7. The system of claim 1 wherein said at least one exterior condition sensor is a solar load sensor and said at least one adverse exterior condition is a solar load below a predetermined threshold solar load.

8. The system of claim 1 wherein the one or more power windows include door windows of the vehicle and a sunroof of the vehicle.

9. The system of claim 1 further including:
   at least one close windows switch mounted on the vehicle for closing all of said one or more power windows, said controller configured to command closing of said one or more power windows when said close windows switch is actuated for closing all of said one or more power windows.

10. The system of claim 9 wherein said controller commands closing of all of said one or more power windows only when said close windows switch is actuated twice in succession and held on the second actuation.

11. The system of claim 9 wherein the at least one close windows switch includes a close windows switch mounted inside the vehicle and another close windows switch mounted on an exterior of the vehicle.

12. The system of claim 1, wherein the predetermined range is a radius of less than ten feet from the vehicle.

13. A control method for controlling one or more power windows of a vehicle, comprising:
   receiving an open window request signal wirelessly from a portable device requesting opening of the one or more power windows of the vehicle;
   monitoring at least one exterior condition relative to the vehicle through at least one exterior condition sensor mounted on the vehicle;
   determining by a control unit if opening of the one or more power windows should be inhibited based on said at least one exterior condition;
   inhibiting opening of the one or more power windows when determined that said opening of the one or more power windows should be inhibited, otherwise opening the one or more power windows;

transmitting a verification signal wirelessly to said portable device when said open window request signal is received; and receiving a confirmation signal wirelessly from said portable device when said portable device receives said verification signal, only opening the one or more power windows when said confirmation signal is received.

14. The method of claim 13 wherein monitoring said at least one exterior condition includes monitoring at least one of rain, temperature or solar load.

15. The method of claim 13 wherein monitoring said at least one exterior condition includes monitoring at least two of rain, temperature or solar load.

16. The method of claim 15 wherein monitoring said at least one exterior condition includes monitoring each of rain, temperature and solar load.

17. The method of claim 13 wherein determining if opening of the one or more power windows should be inhibited based on said at least one exterior condition includes comparing a measured value as measured by said at least one exterior condition to a threshold value stored in a memory.

18. A window control method for a vehicle, comprising:
receiving an open window request from a portable device;
measuring at least one exterior condition relative to the vehicle;
determining by a control unit whether said at least one exterior condition is an adverse exterior condition; and
opening one or more power windows of the vehicle in response to the open window request unless said at least one exterior condition is determined to be an adverse exterior condition;
transmitting a verification signal within a predetermined search area responsive to said open window request signal; and
receiving a confirmation signal from said portable device that is responsive to said portable device receiving said verification signal, wherein said opening of said one or more power windows is allowed only when said confirmation signal is received.

19. The window control method of claim 18 further including:
transmitting said open window request from said portable device in response to an unlock button being pushed twice in succession on said portable device and held for a predetermined period of time after the second push.

20. The window control method of claim 18 wherein said at least one exterior condition is measured by at least one of a rain sensor, a temperature sensor or a solar load sensor, and wherein said adverse exterior condition is at least one of rain, a temperature below a threshold temperature or a solar load below a threshold solar load, said adverse exterior condition corresponding to said at least one exterior condition being measured.

21. A method to control a power window in a vehicle, comprising:
a) sending a wireless activation signal via a portable device to close a window in the vehicle;
b) receiving the activation signal from the portable device;
c) returning a wireless verification signal to verify the activation signal is authorized for the vehicle;
d) sending a wireless identification signal within a predetermined range to indicate the portable device is authorized to close vehicle window and within the predetermined range;
e) receiving the identification signal when the portable device is within the predetermined range of the vehicle; and
f) sending a close command to a windows controller to close the window provided the identification signal is received within a predetermined time in response to the verification signal wherein step f) continues to execute as steps c), d) and e) are repeated, indicating the portable device is within the predetermined range.

22. The method of claim 21, stopping the windows controller if the identification signal is not received or if the window is fully closed.

23. The method of claim 21, wherein the verification signal is a low frequency signal emitted within a radius of less than ten feet from the vehicle thereby defining the predetermined range.

24. The method of claim 21, wherein step f) occurs substantially continuously until the window is closed provided the portable device is within the range to receive the verification signal and then send the identification signal to the vehicle.

* * * * *